United States Patent
Sun

(10) Patent No.: US 7,070,549 B1
(45) Date of Patent: Jul. 4, 2006

(54) INDUCING MECHANISM FOR A TOOL CHANGING DEVICE OF A MACHINE

(76) Inventor: Ying Sun, No. 20, Alley 28, Lane 851, Chung Shan Road, Shen Kang Hsiang, Taichung Hsien (TW) 429

( * ) Notice: Subject to any disclaimer, the term of this patent is extended or adjusted under 35 U.S.C. 154(b) by 42 days.

(21) Appl. No.: 11/014,874

(22) Filed: Dec. 20, 2004

(51) Int. Cl.
*B23Q 3/157* (2006.01)
(52) U.S. Cl. .............................. 483/7; 483/39
(58) Field of Classification Search ........... 483/38–39, 483/44, 62, 66–67, 7, 4, 12, 2; 74/813 C
See application file for complete search history.

(56) References Cited

U.S. PATENT DOCUMENTS

| | | | |
|---|---|---|---|
| 3,128,645 A * | 4/1964 | Anthony ..................... | 483/39 |
| 3,587,359 A * | 6/1971 | McCash et al. ............... | 483/7 |
| 4,856,177 A * | 8/1989 | Takeuchi et al. .............. | 483/9 |
| 5,662,567 A * | 9/1997 | Rutschle et al. .............. | 483/10 |
| 5,749,819 A * | 5/1998 | Yan et al. .................... | 483/39 |
| 6,422,099 B1 * | 7/2002 | Sun ............................. | 74/567 |

FOREIGN PATENT DOCUMENTS

| | | | |
|---|---|---|---|
| JP | 62-004544 A | * | 1/1987 |
| JP | 05-277868 A | * | 10/1993 |
| KR | 2002058397 A | * | 7/2002 |

* cited by examiner

*Primary Examiner*—Erica Cadugan
(74) *Attorney, Agent, or Firm*—Bacon & Thomas

(57) ABSTRACT

A tool changing device of a machine includes an inducing frame connected between the body and the motor of the machine and a plurality of inducing members radially connected in the inducing frame. A signal coupler is connected to an output shaft of the motor and the cam axle so as to transfer the power of the motor. A plurality of inducing portions are connected to an outer periphery of the signal coupler and located corresponding to the inducing members so as to control the motor and precisely position the positions and movement of the tool shaft. By the precise control to the tool shaft, the tools can be changed quickly and correctly.

5 Claims, 5 Drawing Sheets

US 7,070,549 B1

INDUCING MECHANISM FOR A TOOL CHANGING DEVICE OF A MACHINE

FIELD OF THE INVENTION

The present invention relates to an inducing mechanism for precisely positioning the tool arm during change of the tools by using a signal coupler to detect the movement of the output shaft of the motor and the cam axle.

BACKGROUND OF THE INVENTION

A conventional machine center such as CNC machinery includes a tool automatic changer located between the main shaft and the tool cabinet which received multiple tools for being picked up by the tool arm. The tool changer 10 as shown in FIG. 1 includes a motor 12 connected to the body 11 of the machine so as to drive a small befell gear 121 which drives a large bevel gear 13 and a cam 131 on the large bevel gear 13. The cam 131 is cooperated with a bearing 141 to drive a tube 14 which is connected to a sleeve 151 of a tool shaft 15 so that the tool shaft 15 can be indirectly driven. The large bevel gear 13 has a cam 132 which activates a swing arm 16 so as to move the tool shaft 15 axially in the tube 14. A sprocket 133 is connected to a side of an axle 17 of the large bevel gear 13 and a chain 134 is connected between the sprocket 133 and another sprocket 135 to rotate a signal wheel 18. As shown in FIG. 2, a plurality of inducing members 19 are connected to the signal wheel 18 and detects the angular positions and angles of the signal wheel 18 so as to control the rotation angle of the tool shaft 15. By controlling the angles and the travel of the tool shaft 15, the tool arm 152 at the lower end of the tool shaft 15 may catch or release the tools by two catch ends of the tool arm 152. However, the transmission efficiency by the small and large bevel gears 121, 13 and the cam 131 is low. The signal wheel 18 is rotated by the motor 12 via the small bevel gear 121, the large bevel gear 13, the cam 131, the sprockets 133, 135 and the chain 134. Especially for the signal wheel 18, it requires a mechanism outside of the body 11 to install the signal wheel 18, such as a pivot shaft 181, a seal 182 and a cap 183 on the body 11. The whole mechanism is bulky and complicated. The manufacturing cost for the cam 131 is high and chain 134 needs to be adjusted manually and affects the precision of the signal wheel 18. The signal area 184 of the signal wheel 18 may not be matched with the inducing members 19 such that the tool shaft 15 cannot be precisely positioned. Besides, in order to smoothly operate the bevel gears 121, 13, lubrication oil is filled in the body 11. When moving the body 11, the lubrication oil could leak if the body 11 is put in a wrong orientation.

The present invention intends to provide an inducing mechanism that provides a signal coupler to directly transfer the power of the motor and a inducing frame is used to obtain a precise and stable control feature. The mechanism includes less number of parts and can be manufactured at lower cost.

SUMMARY OF THE INVENTION

The present invention relates to a tool changing device of a machine which includes a motor disposed to an outside of the machine body in which a cam axle is located and a tool shaft is connected to the body. A tool arm is connected to an end of the tool shaft and has two catch ends on two ends of the tool arm so that when the tool arm is rotated by the motor via the cam axle to catch desired tools. An inducing frame is connected between the body and the motor. A plurality of inducing members are radially connected in the inducing frame and located corresponding to the space. A signal coupler is connected to an output shaft of the motor and the cam axle. A plurality of inducing portions are connected to an outer periphery of the signal coupler and located corresponding to the inducing members so as to control the motor.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
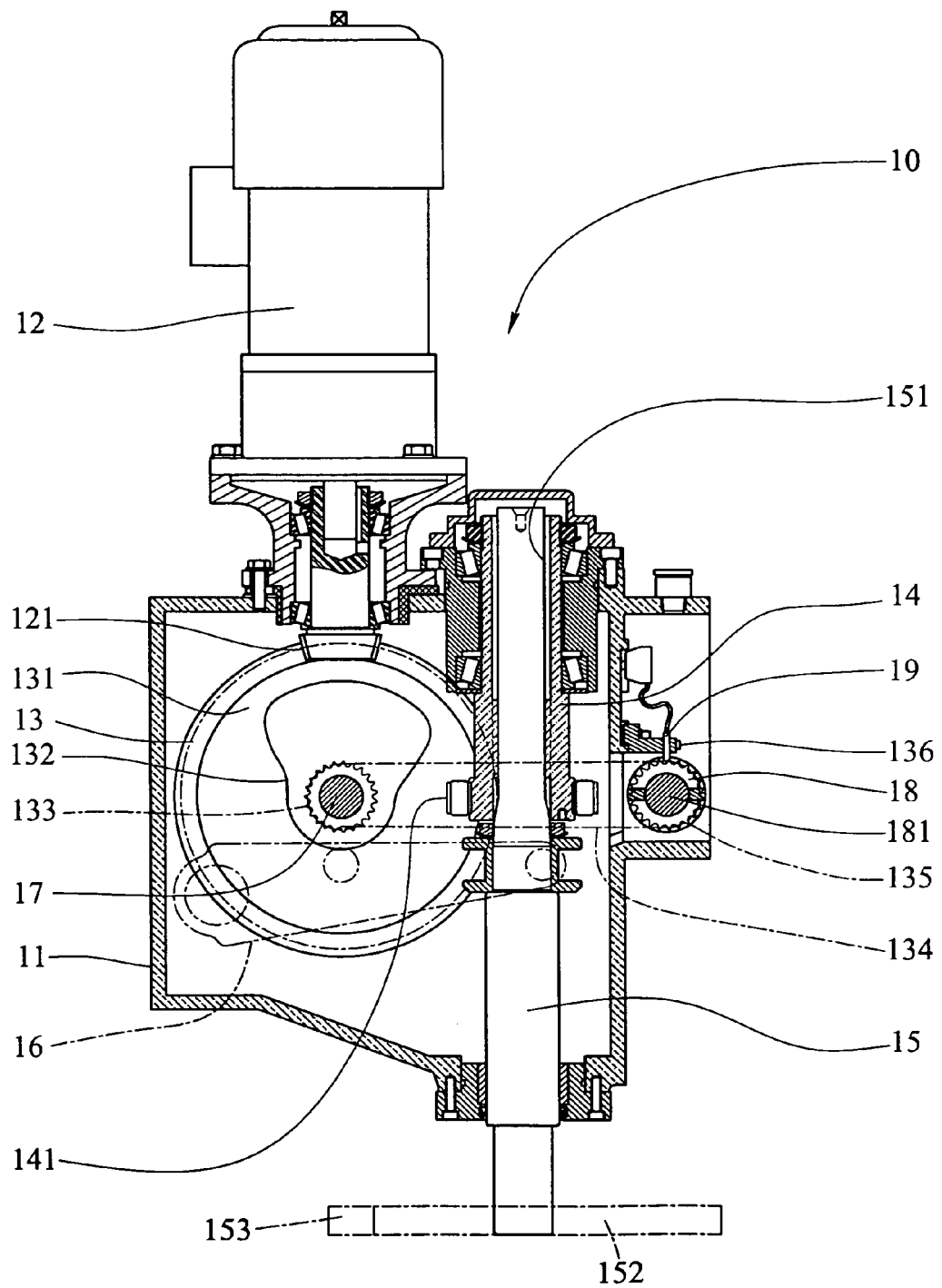
FIG. 1 is a partial cross sectional view to show a conventional tool changing device.
Figure 2:
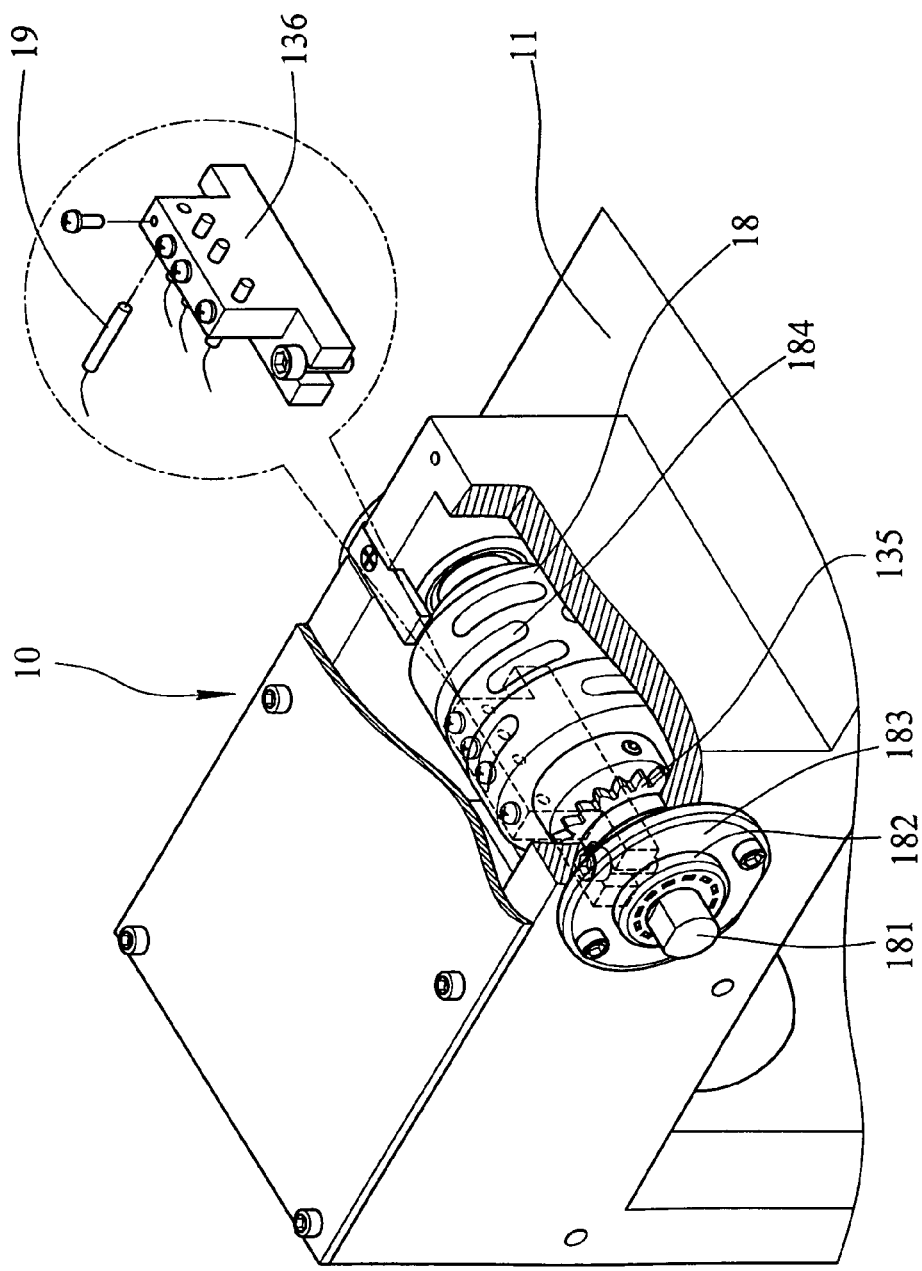
FIG. 2 shows a perspective view of the conventional tool changing device.
Figure 3:
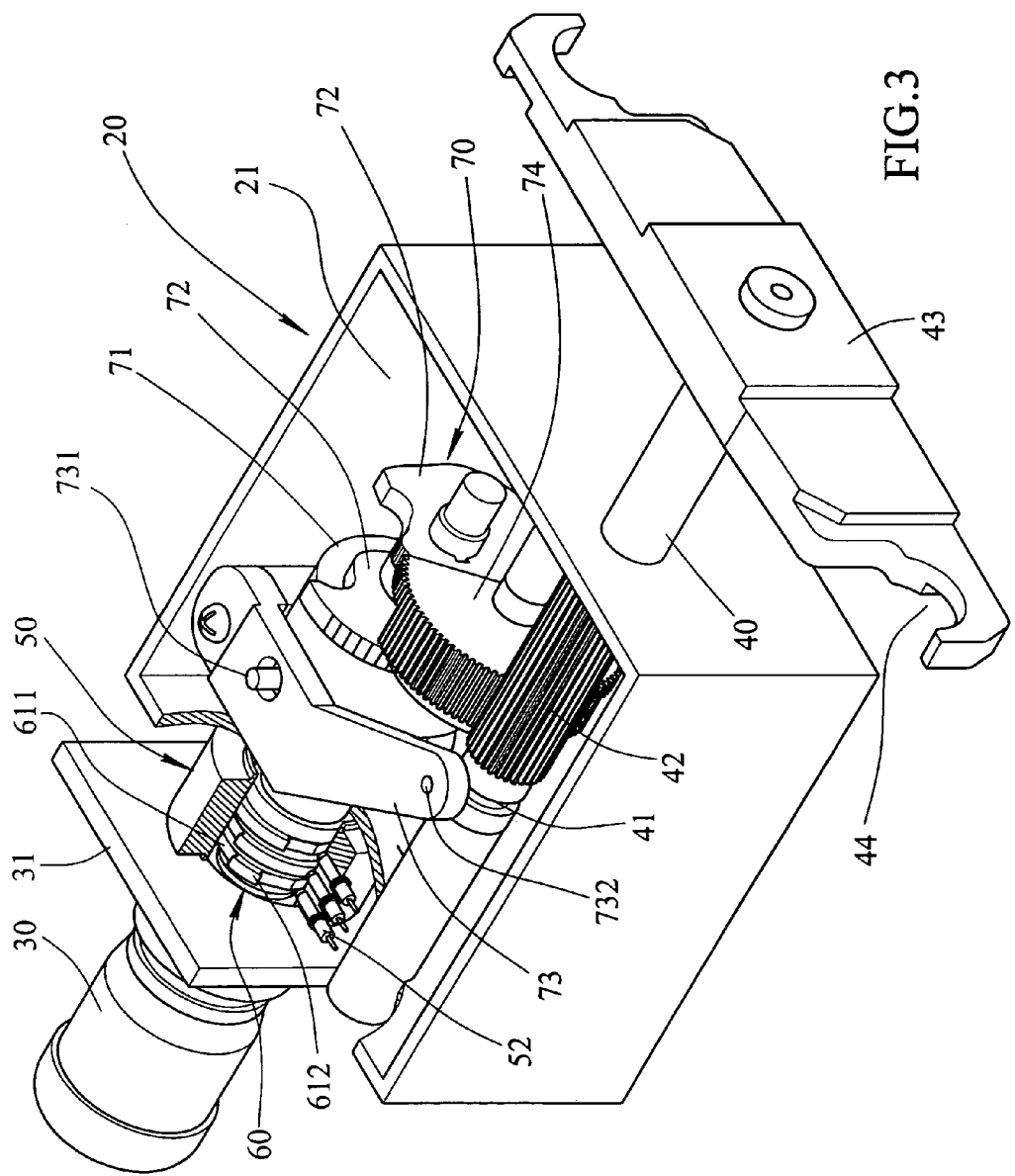
FIG. 3 shows a perspective view of the tool changing device of the present invention.
Figure 4:
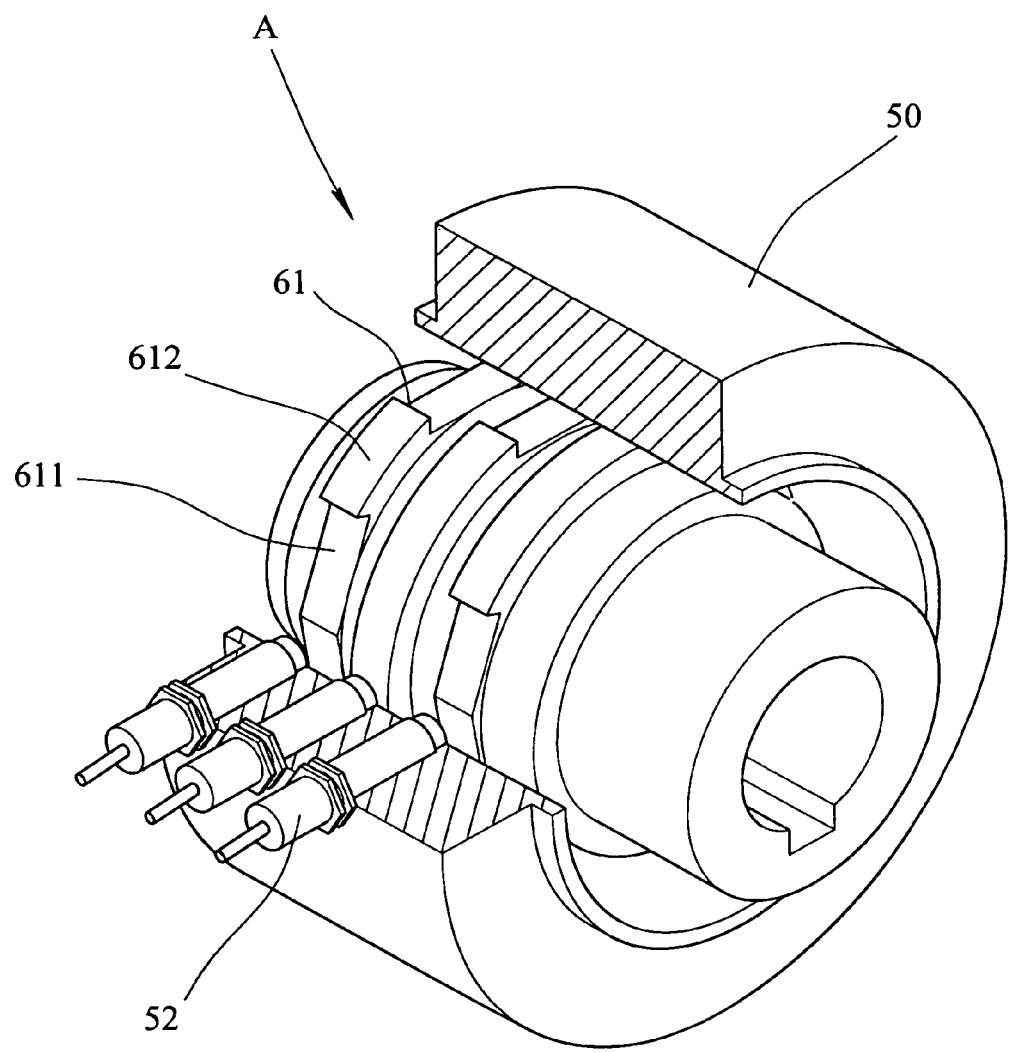
FIG. 4 shows the signal coupler and the inducing members of the tool changing device of the present invention.
Figure 5:
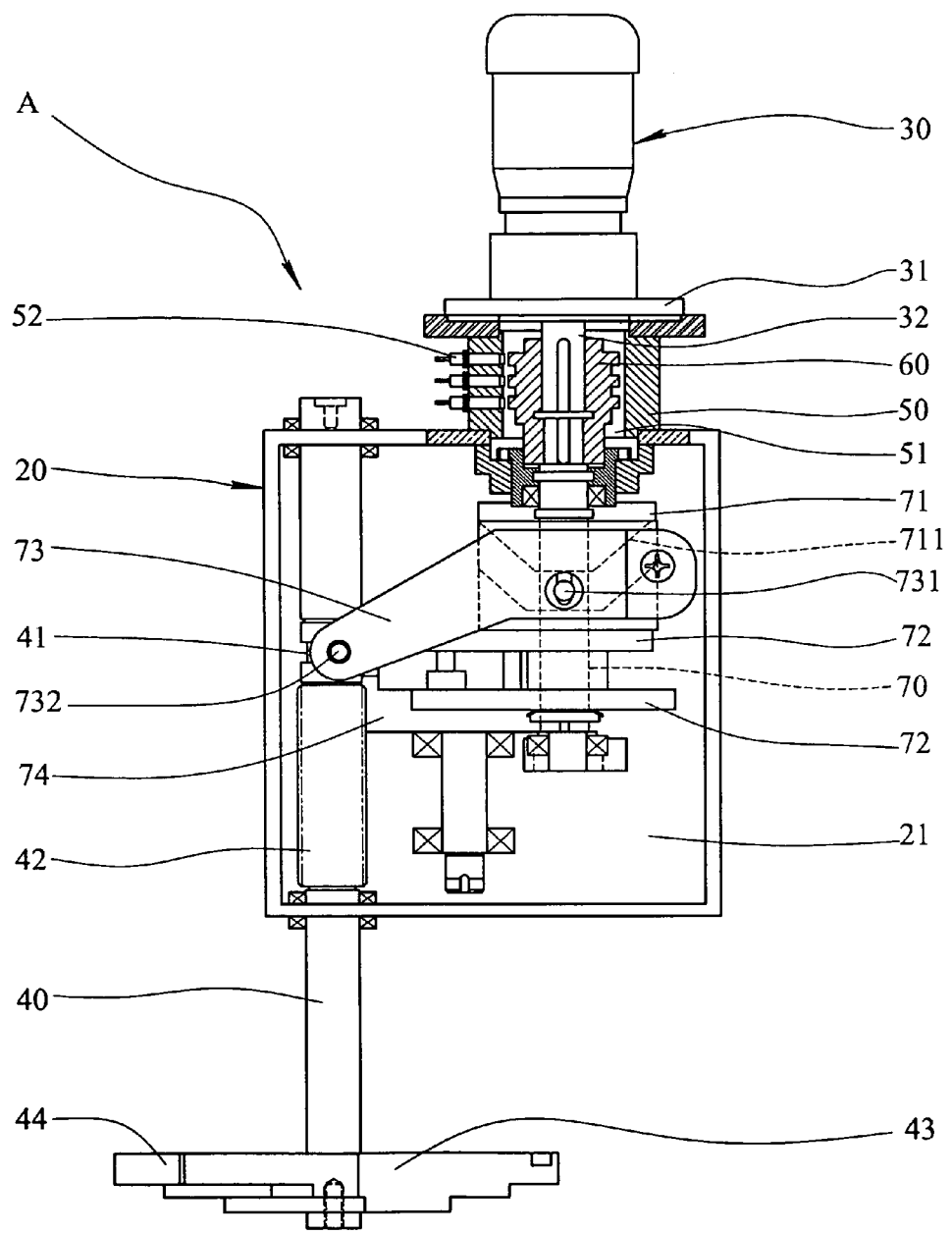
FIG. 5 shows is a partial cross sectional view of the tool changing device of the present invention.

Referring to FIGS. 3 to 5, the tool changing device of the present invention comprises includes a body 20, a motor 30, a tool shaft 40, an inducing mechanism "A" including an inducing frame 50 and a signal coupler 60, and a cam axle 70.

The motor 30 is located outside of the body 20 which includes an interior and an output shaft 32 extends from the motor 30 and is connected to a tool shaft 40 in the interior 21 of the body 20. The tool shaft 40 has an annular groove 41 and a threaded portion 42. An end of the tool shaft 40 extends beyond the body 20 and a tool arm 43 is connected to the distal end of the tool shaft 40. Two catch ends 44 are defined in two ends of the tool arm 43 so as to catch tools which are not shown.

The inducing frame 50 is connected between the body 20 and the motor 30, wherein the motor 30 includes a fixing portion 31 which is fixed to the inducing frame 50. A plurality of inducing members 52 are radially connected in the inducing frame 50 and located corresponding to a longitudinal space 51 defined in the inducing frame 50.

The signal coupler 60 has one end connected to the output shaft 32 of the motor 30 and a desired number of inducing portions 61 are connected to an outer periphery thereof. Each inducing portion 61 includes a plurality of recesses 611 and protrusions 612. The recesses 611 and the protrusions 612 are located alternative with each other so as to induce with the inducing members 52 of the inducing frame 50.

The cam axle 70 is located in the body 20 has one end connected with the signal coupler 60 and includes a tubular cam 71 and a conjugate cam 72 mounted thereto. A V-shaped slot 711 is defined in an outer periphery of the cam 71 such that a middle portion of a swing arm 73 is slidably engaged with the V-shaped slot 711. One end of the swing arm 73 is pivotably connected to the body 20 and the other end of the swing arm 73 is engaged with the annular groove 41 of the tool shaft 40 so as to move the tool shaft 40 up and down. The conjugate cam 72 drives a gear 74 on the body 20 toward a pre-decided direction and the gear 74 is engaged with the threaded portion 42 of the tool shaft 40 so as to drive the tool shaft 40.

As shown in FIG. 5, the power of the motor 30 drives the signal coupler 60 of the inducing mechanism "A" and the signal coupler 60 drives the cam axle 70. The cam 71 and the conjugate cam 72 are rotated respectively wherein the cam 71 drives the tool shaft 40 via the swing arm 73 and the conjugate cam 72 drives the tool shaft 40 via the gear 74. The inducing portions 61 are co-rotated with the signal coupler 60 and induces the inducing members 52 on the inducing frame 50. The induced signals are then sent to the motor 30 which is then precisely control the angular positions of the tool shaft 40 to correctly catch desired tools.

The signal coupler 60 is connected between the motor 30 and the cam axle 70 so that the power is directly transferred which has higher efficiency. Furthermore, the signal coupler 60 is directly driven by the motor 30 and induces the inducing members 52 of the inducing frame 50 so as to have a precision of control. The device of the present invention involves less number of parts and can be manufactured at lower cost.

While we have shown and described the embodiment in accordance with the present invention, it should be clear to those skilled in the art that further embodiments may be made without departing from the scope of the present invention.

What is claimed is:

1. A tool changing device of a machine comprising:

a body, a motor located outside of the body, a cam axle located in the body and a tool shaft connected to the body, a tool arm connected to an end of the tool shaft and having two catch ends on two ends of the tool arm, the tool arm being rotated and moved by the motor via the cam axle, an inducing frame connected between the body and the motor, a longitudinal space is defined in the inducing frame and a plurality of inducing members radially connected in the inducing frame and located corresponding to the space, and a signal coupler connecting an output shaft of the motor and the cam axle, a plurality of inducing portions connected to an outer periphery of the signal coupler and located corresponding to the inducing members so as to control the motor.

2. The device as claimed in claim 1, wherein the signal coupler has at least one inducing portion which includes a plurality of recesses and protrusions.

3. The device as claimed in claim 1, wherein the cam axle is connected to a cam which includes a V-shaped slot defined in an outer periphery thereof, a middle portion of a swing arm slidably engaged with the V-shaped slot, one end of the swing arm pivotably connected to the body and the other end of the swing arm engaged with an annular groove of the tool shaft.

4. The device as claimed in claim 1, wherein a conjugate cam is connected to the cam axle so as to drive a gear on the body, the gear is engaged with a threaded portion of the tool shaft so as to drive the tool shaft.

5. The device as claimed in claim 1, wherein the motor includes a fixing portion which is fixed to the inducing frame.

* * * * *